J. W. LEDOUX.
APPARATUS FOR IMPREGNATING LIQUIDS WITH COAGULANTS.
APPLICATION FILED NOV. 28, 1908.

976,665.

Patented Nov. 22, 1910.

2 SHEETS—SHEET 1.

WITNESSES:

INVENTOR
John W. Ledoux
BY
Charles N. Butler
ATTORNEY.

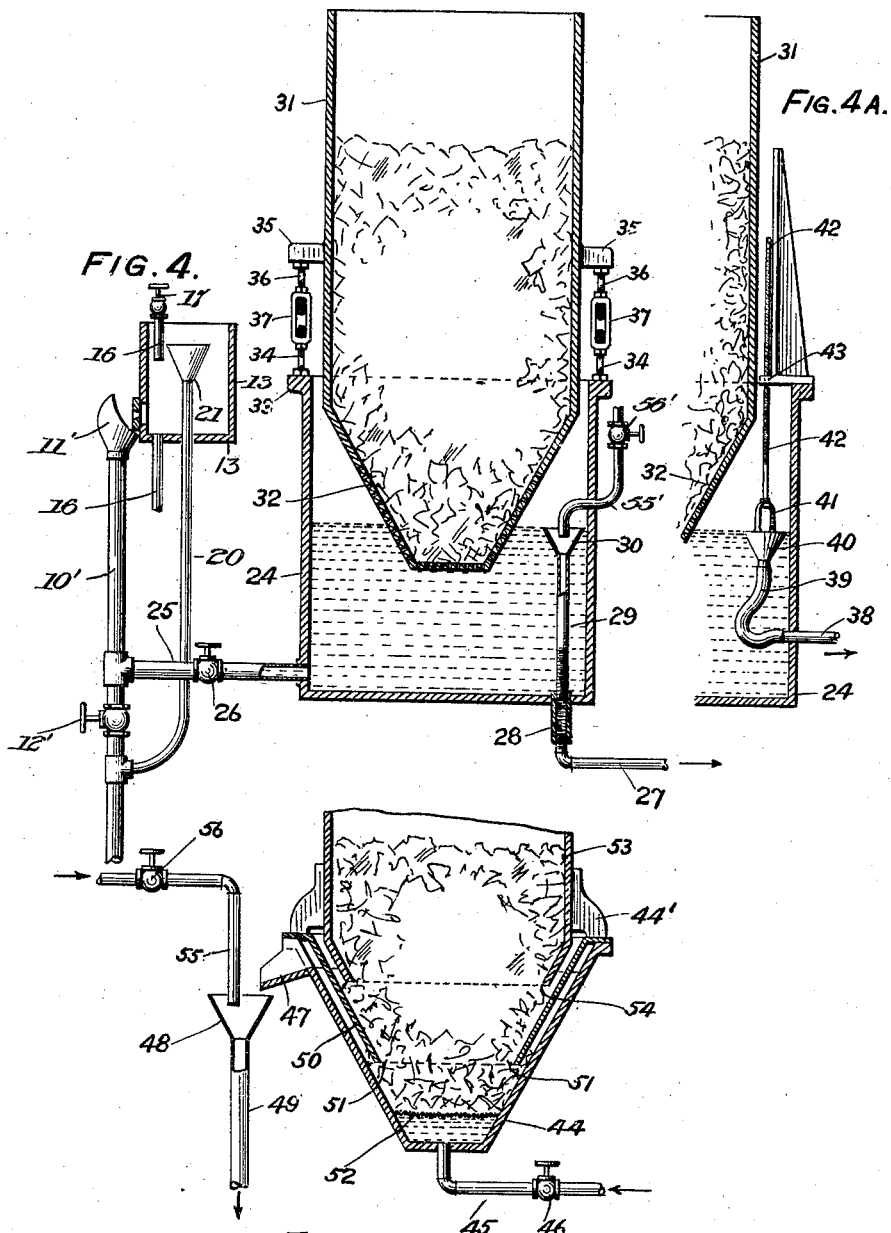

UNITED STATES PATENT OFFICE.

JOHN W. LEDOUX, OF SWARTHMORE, PENNSYLVANIA.

APPARATUS FOR IMPREGNATING LIQUIDS WITH COAGULANTS.

976,665.  Specification of Letters Patent.  Patented Nov. 22, 1910.

Application filed November 28, 1908. Serial No. 464,939.

*To all whom it may concern:*

Be it known that I, JOHN W. LEDOUX, a citizen of the United States, residing at Swarthmore, in the county of Delaware and State of Pennsylvania, have invented certain Improvements in Apparatus for use in Impregnating Liquids with Coagulants.

My invention is designed primarily to provide improved means for impregnating water with a suitable substance, such as alum, to effect the coagulation and removal by filtration of foreign matter, and to this end, in the preferred operation, a regulated quantity of water is carried through a regulated quantity of coagulant at a uniform rate so that the impregnation obtained is of the desired degree.

The characteristic features of the improvements are fully disclosed in the accompanying drawings and the following description thereof.

Figure 3:
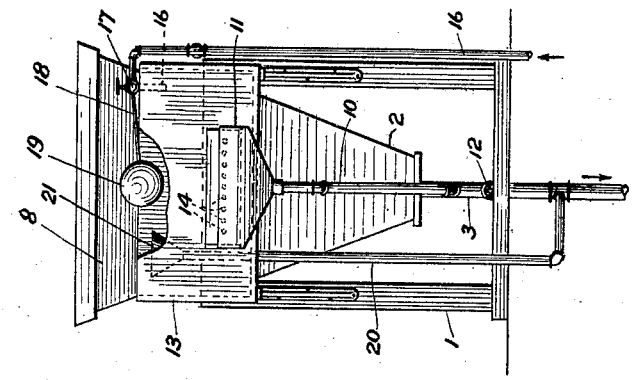
Figure 2:
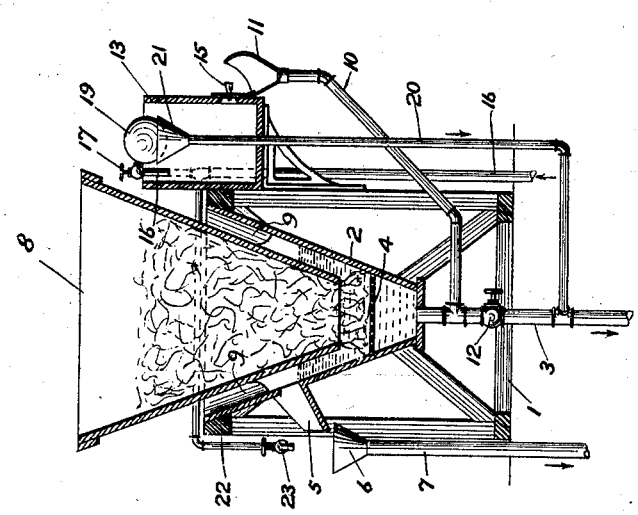
Figure 1:
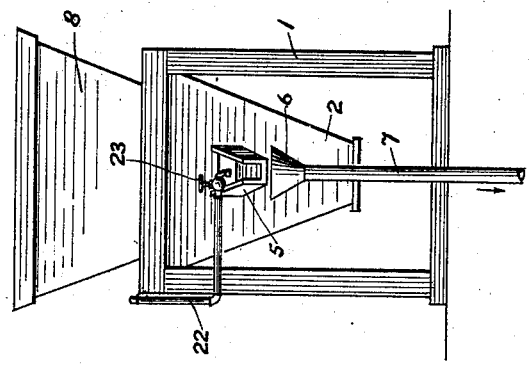

In the drawings, Figure 1 is an elevation of apparatus employed in practicing my invention; Fig. 2 is a sectional elevation of the same taken at right angles to the view shown in Fig. 1; Fig. 3 is an elevation of the same viewed from the rear of Fig. 1; Fig. 4 is a sectional elevation of a form of tank and receptacle; Fig. 4ᵃ is a sectional elevation showing a modification of the construction of Fig. 4, and Fig. 5 is a sectional elevation showing a further modification in the construction of the tank and receptacle.

The apparatus, as illustrated in Figs. 1 to 3 inclusive, comprises a frame 1 which supports a downwardly tapered water tank 2 having a pipe 3 communicating therewith through the bottom thereof, a perforated diaphragm or screen 4 disposed above the bottom, and a weir or spout 5 disposed above the diaphragm and discharging into the mouth 6 of a pipe 7. A downwardly tapered coagulant receptacle 8 is supported by the blocks 9 with its lower open end in the tank between the diaphragm and weir; the body of the receptacle extending above the tank and being adapted for containing a store of coagulant which is fed into the tank and supported by the diaphragm. A pipe 10, having a wide mouth or funnel 11, is connected with the pipe 3 between the valve 12 therein and the bottom of the tank 2, and a vessel 13 has near the bottom thereof the apertures 14 which discharge into the funnel, the apertures being provided with plugs 15, by which the amount of the discharge from the vessel can be regulated. A pipe 16, leading to the vessel 13, contains a valve 17 which is connected by a rod 18 with a float 19 in the vessel, the flow through the pipe into the vessel being automatically controlled, and the desired head of water in the vessel maintained by the float. An over-flow pipe 20, leading from the vessel 13 to the pipe 3, is provided with an inlet mouth 21 which is placed in the vessel and limits the upper level of the water therein. A pipe 22, controlled by a valve 23, leads from the pipe 16 to position to discharge into the funnel 6 and supply water thereto which has not been charged with the coagulant.

It will be understood that by means of the automatically operated valve 17 and the overflow pipe 20 a constant head is maintained in the vessel 13 by which a constant quantity of water flows by way of the pipe 10 through a constant quantity of coagulant supported within the tank 2 and the receptacle 8; the impregnated water discharging from the vessel 2 by way of the spout 5 and the coagulant feeding down from the receptacle 8 to maintain the constant quantity immersed as depletion takes place through its absorption by the water.

In Fig. 4 there is shown a modified form of apparatus comprising the tank 24 having connected with the bottom thereof the inlet pipe 25 controlled by the valve 26, and leading from the tank the pipe 27 connected by the internally threaded sleeve 28 (set in the bottom) with the pipe section 29 having the mouth 30 within the tank, the height of the mouth being variable to vary the volume of water in the tank by screwing the pipe section up or down in the sleeve.

A receptacle 31, for holding the coagulant, has its downwardly tapered perforated bottom 32 disposed within the tank and held in adjustable relation thereto. To support and adjust the elevation of the receptacle, bearings 33 on the tank support the threaded rods 34 and bearings 35 on the receptacle are supported by the threaded rods 36, the respective rods being connected by the turn buckles 37 with which they form struts. The desired amount of the coagulant immersed in the water, as well as the desired amount of water in process of impregnation by contact with the coagulant through the perforated bottom, can thus be regulated, while the wasting alum is replaced by gravitation from the store in the receptacle.

The pipe 25 is connected with the pipe 10' containing a valve 12' and having a funnel 11' thereon. The vessel 13 discharges through the aperture 14 into the funnel at a constant rate, which is maintained by maintaining a constant level in the tank 15, the latter being supplied by the pipe 16 controlled by the valve 17 and discharging by the overflow pipe 20 having the inlet 21. Water that has been impregnated may be further diluted by means of a pipe 55' controlled by a valve 56' adapted for discharging water into the pipe 29 by way of the funnel 30.

In the construction shown in Fig. 4ª the tank 24, having the perforated bottom of the receptacle 31 therein, is provided with an outlet pipe 38 which is connected by a flexible hose 39 with a funnel or mouth 40, the latter having a bail 41 connected with a gage rod 42 which moves through the way 43 and can be fixed in any desired position.

In the construction shown in Fig. 5, the downwardly tapered tank 44 has connected with the bottom thereof an inlet pipe 45 controlled by the valve 46 and near the top thereof the spout or weir 47 which discharges into the mouth 48 of the pipe 49. A shield 50 is supported within the tank (so as to cover the weir without cutting it off from the inlet pipe) and tapers downwardly to an open mouth 51 above a diaphragm or screen 52 placed above the inlet.

A coagulant receptacle 53, suitably supported on the tank 44 by brackets 44', has its open mouth 54 disposed within the shield, the coagulant falling from the receptacle upon and through the shield to the screen, through which water rises to be impregnated and discharged through the weir.

A pipe 55, controlled by a valve 56, discharges into the funnel 48 and provides means for mingling water that has not been charged previously with the coagulant with water that has previously been charged, which is sometimes desirable.

The foregoing constructions provide, either by the perforated bottoms 32 or the screens 4 and 52, perforated diaphragms for supporting the coagulant, which is fed thereto as rapidly as it is absorbed by the water, the desired ratio being obtainable and maintained between the volume of water and coagulant in contact.

Having described my invention, I claim:

1. In apparatus of the class described, the combination of means for holding a predetermined quantity of a liquid, means for charging said liquid at a predetermined rate, with means for maintaining in said liquid a predetermined quantity of solid, whereby said liquid absorbs a substantially constant amount of said solid.

2. In apparatus of the class described, a container and means for passing liquid therethrough at a predetermined rate, in combination with means for maintaining a predetermined quantity of solid in the liquid in said container.

3. In apparatus of the class described, a liquid container having an outlet for maintaining the level of liquid therein, means for holding a store of coagulant and feeding the same to said liquid so as to maintain a constant amount thereof submerged in said liquid, means for supplying liquid to said container, and means for maintaining a constant liquid head controlling said liquid supply.

4. In apparatus of the class described, a liquid container and means whereby the liquid therein is charged at a predetermined rate, in combination with means for holding a store of solid and feeding it so that a predetermined amount thereof is dissolved in the liquid in said container.

5. In apparatus of the class described, a liquid container having an overflow passage connected therewith for maintaining the desired level of liquid therein, means for holding a store of coagulant and supplying the same to said liquid so as to maintain a constant quantity of coagulant therein, means for supplying liquid to said container under a constant head, and means for regulating the amount of liquid discharged under said head to said vessel.

6. In apparatus of the class described, a tank having an outlet above the bottom thereof and means whereby water therein is changed at a substantially uniform rate, in combination with means for holding a store of coagulant and maintaining a substantially uniform quantity thereof in the water in said tank.

7. In apparatus of the class described, a water tank, means for supplying water to said tank at a substantially uniform rate, an outlet variable in elevation by which water flows from said tank, and a reservoir for holding a store of coagulant above the water level in said tank and feeding said coagulant so that a substantially uniform amount thereof is maintained in the water in said tank.

8. In apparatus of the class described, a water tank, means for changing the water in said tank at various predetermined rates, a reservoir for holding a coagulant above and beneath the water level in said tank, and means for varying the elevation of said reservoir relatively to said tank.

9. In apparatus of the classs described, a water tank, means for changing the water therein at a predetermined rate, a reservoir for holding a coagulant above and beneath the water level in said tank, and means for adjusting the height of said reservoir relatively to said tank.

10. In apparatus of the class described, a container with means for passing water therethrough at a predetermined rate, means for maintaining a predetermined amount of coagulant in said water, and means for diluting said water impregnated with said solid.

In witness whereof I have hereunto set my name this 21st day of October, A. D. 1908, in the presence of the subscribing witnesses.

JOHN W. LEDOUX.

Witnesses:
ROBERT JAMES EARLEY,
JOS. G. DENNY, Jr.